US006384121B1

(12) United States Patent
Barbee et al.

(10) Patent No.: US 6,384,121 B1
(45) Date of Patent: May 7, 2002

(54) POLYMETER/CLAY NANOCOMPOSITE COMPRISING A FUNCTIONALIZED POLYMER OR OLIGOMER AND A PROCESS FOR PREPARING SAME

(75) Inventors: Robert Boyd Barbee; John Walker Gilmer; Sam Richard Turner, all of Kingsport, TN (US); James Christopher Matayabas, Jr., Chandler, AZ (US)

(73) Assignee: Eastman Chemical Company, Kingsport, TN (US)

(*) Notice: Subject to any disclaimer, the term of this patent is extended or adjusted under 35 U.S.C. 154(b) by 0 days.

(21) Appl. No.: 09/452,827

(22) Filed: Dec. 1, 1999

Related U.S. Application Data

(60) Provisional application No. 60/111,284, filed on Dec. 7, 1998.

(51) Int. Cl.$^7$ .................................. C08K 3/34
(52) U.S. Cl. ................ 524/445; 524/447; 501/148
(58) Field of Search .................. 428/333, 338, 428/339; 501/148; 523/210; 524/445, 446, 447

(56) References Cited

U.S. PATENT DOCUMENTS

| | | |
|---|---|---|
| 2,531,427 A | 11/1950 | Hauser |
| 2,737,517 A | 3/1956 | Boyd |
| 2,924,609 A | 2/1960 | Joyce |
| 2,938,914 A | 5/1960 | Joyce |
| 2,957,010 A | 10/1960 | Straley et al. |
| 2,966,506 A | 12/1960 | Jordan |
| 3,076,821 A | 2/1963 | Hoare |
| 3,125,586 A | 3/1964 | Katz et al. |
| 3,232,934 A | 2/1966 | Hoare |
| 3,281,434 A | 10/1966 | Turetzky et al. |
| 3,391,164 A | 7/1968 | Straley et al. |
| 3,499,916 A | 3/1970 | Berthold |
| 3,514,498 A | 5/1970 | Okazaki et al. |
| 3,544,523 A | 12/1970 | Maxion |
| 3,627,625 A | 12/1971 | Jarrett |
| 3,646,072 A | 2/1972 | Shaw |
| 3,700,398 A | 10/1972 | Cole, Jr. |
| 3,792,969 A | 2/1974 | Gertisser |
| 3,823,169 A | 7/1974 | Staub |
| 3,843,479 A | 10/1974 | Matsunami et al. |
| 3,849,406 A | 11/1974 | Basel et al. |
| 3,876,552 A | 4/1975 | Moynihan |
| 3,946,089 A | 3/1976 | Furukawa et al. |
| 4,018,746 A | 4/1977 | Brinkmann et al. |
| 4,064,112 A | 12/1977 | Rothe et al. |
| 4,071,503 A | 1/1978 | Thomas et al. |
| 4,081,496 A | 3/1978 | Finlayson |
| 4,105,578 A | 8/1978 | Finlayson et al. |
| 4,116,866 A | * 9/1978 | Finlayson |
| 4,133,802 A | * 1/1979 | Hachiboshi et al. |
| 4,161,578 A | * 7/1979 | Herron |
| 4,163,002 A | * 7/1979 | Pohl et al. |

(List continued on next page.)

FOREIGN PATENT DOCUMENTS

| | | |
|---|---|---|
| DE | 3806548 | 9/1988 |
| DE | 3808623 | 10/1988 |
| EP | 186456 | 7/1986 |

(List continued on next page.)

OTHER PUBLICATIONS

MSDS—Polyvinyl Alcohol.
MSDS—Clay (Montmorillonite).
*Encyclopedia of Polymer Science and Engineering*, 2nd Edition, 12, 364–383 (1988).
LeBaron et al., "Polymer–layered silicate nanocomposites: an overview," *App. Clay Sci.*, 15, 11–29 (1999).
Ke et al., "Crystallization, Properties, and Crystal and Nanoscale Morphology of PET–Clay Nanocomposites," *J. Appl. Polym. Sci.*, 71, 1139–1146 (1999).
Kawasumi et al., "Preparation and Mechanical Properties of Polypropylene–Clay Hybrids," *Macromolecules*, 30, 6333–6338 (1997).
Usuki et al., "Synthesis of Propylene–Clay Hybrid" *J. Appl. Polym. Sci.*, 63, 137–139 (1997).
Giannelis, "Polymer Layered Silicate Nanocomposites," *Advanced Materials*, 8, 29–35 (1996).
Kurokawa et al., "Preparation of a nanocomposite of polypropylene and smectite," *J. Materials Science Letters*, 15, 1481–1483 (1996).
Oriakhi et al., "Incorporation of poly(acrylic acid), poly(vinylsulfonate) and poly(styrenesulfonate) within layered double hydroxides," *J. Mater. Chem.*, 6, 103–107 (1996).
Messersmith et al., "Syntheses and Barrier Properties of Poly(ϵ–Caprolactone)–Layered Silicate Nanocomposites," *J. of Polym. Sci.*, 33, 1047–1057 (1995).
Pinnavaia et al., "Clay–Reinforced Epoxy Nanocomposites," *Chem. Mater.*, 6, 2216–2219 (1994).
Sugahara et al., "Clay–Organic Nano–Composite: Preparation of a Kaolinite—Poly(vinylpyrrolidone) intercalation Compound," *J. Ceramic Society of Japan*, 100, 413–416 (1992).

(List continued on next page.)

*Primary Examiner*—Edward J. Cain
*Assistant Examiner*—K. Wyroszebski Lee
(74) *Attorney, Agent, or Firm*—Bernard J. Graves, Jr., Esq.

(57) ABSTRACT

The invention is directed to an nanocomposite material and products produced from the nanocomposite material. This invention is also directed to a process for preparing a polymer-clay nanocomposite comprising the steps of (i) forming a concetrate comprising a layered clay material with a matrix polymer-compatible functionalized oligomer or polymer, and (ii) melt compounding the concentrate with a melt-processible matrix polymer to produce a polymer-clay nanocomposite.

55 Claims, No Drawings

U.S. PATENT DOCUMENTS

| | | | |
|---|---|---|---|
| 4,208,218 A | * | 6/1980 | Finlayson |
| 4,219,527 A | * | 8/1980 | Edelman et al. |
| 4,239,826 A | | 12/1980 | Knott, II et al. |
| 4,391,637 A | * | 7/1983 | Mardis et al. |
| 4,393,007 A | * | 7/1983 | Priester et al. |
| 4,398,642 A | * | 8/1983 | Okudaria et al. |
| 4,410,364 A | * | 10/1983 | Finlayson et al. |
| 4,412,018 A | * | 10/1983 | Finlayson et al. |
| 4,429,079 A | | 1/1984 | Shibata et al. |
| 4,434,075 A | * | 2/1984 | Mardis et al. |
| 4,434,076 A | * | 2/1984 | Mardis et al. |
| 4,442,163 A | * | 4/1984 | Kühner et al. |
| 4,450,095 A | * | 5/1984 | Finlayson |
| 4,472,538 A | * | 9/1984 | Kamigaito et al. |
| 4,482,695 A | * | 11/1984 | Barbee et al. |
| 4,517,112 A | * | 5/1985 | Mardis et al. |
| 4,536,425 A | * | 8/1985 | Hekal |
| 4,546,126 A | * | 10/1985 | Breitenfellner et al. |
| 4,595,715 A | * | 6/1986 | Kuze et al. |
| 4,600,409 A | * | 7/1986 | Campbell |
| 4,646,925 A | | 3/1987 | Nohara |
| 4,676,929 A | * | 6/1987 | Rittler |
| 4,677,158 A | * | 6/1987 | Tso et al. |
| 4,680,208 A | | 7/1987 | Aoki et al. |
| 4,720,420 A | | 1/1988 | Crass et al. |
| 4,725,466 A | | 2/1988 | Crass et al. |
| 4,739,007 A | * | 4/1988 | Okada et al. |
| 4,742,098 A | * | 5/1988 | Finlayson et al. |
| 4,769,078 A | * | 9/1988 | Tso |
| 4,777,206 A | * | 10/1988 | Rittler |
| 4,810,734 A | * | 3/1989 | Kawasumi et al. |
| 4,889,885 A | * | 12/1989 | Usuki et al. |
| 4,894,411 A | * | 1/1990 | Okada et al. |
| 4,946,365 A | | 8/1990 | Kudert et al. |
| 4,957,980 A | * | 9/1990 | Kobayashi et al. |
| 4,983,432 A | | 1/1991 | Bissot |
| 4,983,719 A | * | 1/1991 | Fox et al. |
| 4,994,313 A | * | 2/1991 | Shimizu et al. |
| 5,028,462 A | * | 7/1991 | Matlack et al. |
| 5,034,252 A | | 7/1991 | Nilsson et al. |
| 5,037,285 A | | 8/1991 | Kudert et al. |
| 5,091,462 A | * | 2/1992 | Fukui et al. |
| 5,102,948 A | * | 4/1992 | Deguchi et al. |
| 5,110,501 A | * | 5/1992 | Knudson, Jr. et al. |
| 5,149,485 A | * | 9/1992 | Belcher |
| 5,153,061 A | | 10/1992 | Cavagna et al. |
| 5,153,062 A | * | 10/1992 | Grolig et al. |
| 5,164,440 A | | 11/1992 | Deguchi et al. |
| 5,164,460 A | | 11/1992 | Yano et al. |
| 5,206,284 A | | 4/1993 | Fukui et al. |
| 5,221,507 A | | 6/1993 | Beck et al. |
| 5,248,720 A | | 9/1993 | Deguchi et al. |
| 5,273,706 A | | 12/1993 | Laughner |
| 5,314,987 A | | 5/1994 | Kim et al. |
| 5,334,241 A | | 8/1994 | Jordan |
| 5,336,647 A | | 8/1994 | Naë et al. |
| 5,340,884 A | | 8/1994 | Mills et al. |
| 5,374,306 A | | 12/1994 | Schlegel et al. |
| 5,382,650 A | | 1/1995 | Kasowski et al. |
| 5,385,776 A | | 1/1995 | Maxfield et al. |
| 5,414,042 A | | 5/1995 | Yasue et al. |
| 5,429,999 A | | 7/1995 | Naé et al. |
| 5,434,000 A | | 7/1995 | Konagaya et al. |
| 5,514,734 A | | 5/1996 | Maxfield et al. |
| 5,523,045 A | | 6/1996 | Kudert et al. |
| 5,530,052 A | | 6/1996 | Takekoshi et al. |
| 5,552,469 A | | 9/1996 | Beall et al. |
| 5,578,672 A | | 11/1996 | Beall et al. |
| 5,612,138 A | | 3/1997 | Kurz et al. |
| 5,620,774 A | | 4/1997 | Etchu et al. |
| 5,648,159 A | | 7/1997 | Sato |
| 5,660,761 A | | 8/1997 | Katsumoto et al. |
| 5,665,454 A | | 9/1997 | Hosoi et al. |
| 5,728,764 A | | 3/1998 | Bauer et al. |
| 5,747,560 A | | 5/1998 | Christiani et al. |
| 5,780,376 A | | 7/1998 | Gonzales et al. |
| 5,807,630 A | | 9/1998 | Christie et al. |
| 5,830,544 A | | 11/1998 | Kerscher et al. |
| 5,849,830 A | | 12/1998 | Tipursky et al. |
| 5,882,751 A | | 3/1999 | Occhiello et al. |
| 5,942,320 A | | 8/1999 | Miyake et al. |
| 5,952,093 A | * | 9/1999 | Nichols et al. ............. 428/323 |
| 5,993,769 A | * | 11/1999 | Pinnavaia et al. .......... 423/331 |
| 6,017,632 A | | 1/2000 | Pinnavaia et al. |
| 6,034,163 A | | 3/2000 | Barbee et al. |
| 6,036,765 A | | 3/2000 | Farrow et al. |
| 6,050,509 A | | 4/2000 | Clarey et al. |
| 6,057,396 A | | 5/2000 | Lan et al. |
| 6,060,549 A | * | 5/2000 | Li et al. ..................... 524/445 |
| 6,071,988 A | * | 6/2000 | Barbee et al. ............. 523/210 |
| 6,084,019 A | * | 7/2000 | Matayabas, Jr. et al. .... 524/445 |
| 6,117,541 A | | 9/2000 | Frisk |
| 6,120,860 A | | 9/2000 | Bowen et al. |
| 6,162,857 A | | 12/2000 | Trexler et al. |
| 6,232,388 B1 | | 5/2001 | Lan et al. |

FOREIGN PATENT DOCUMENTS

| | | |
|---|---|---|
| EP | 0202532 | 11/1986 |
| EP | 261430 | 3/1988 |
| EP | 278403 | 8/1988 |
| EP | 295336 | 12/1988 |
| EP | 398551 | 11/1990 |
| EP | 459472 | 12/1991 |
| EP | 542266 | 5/1993 |
| EP | 0590263 | 4/1994 |
| EP | 650994 | 5/1995 |
| EP | 0691212 | 1/1996 |
| EP | 0691376 | 1/1996 |
| EP | 681990 | 11/1996 |
| EP | 747451 | 12/1996 |
| EP | 0761739 | 3/1997 |
| EP | 780340 | 6/1997 |
| EP | 0822163 | 2/1998 |
| EP | 846723 | 6/1998 |
| EP | 0846723 | 6/1998 |
| EP | 0 899 301 A1 | 3/1999 |
| EP | 0 909 787 A1 | 4/1999 |
| EP | 0909787 | 4/1999 |
| EP | 940430 | 9/1999 |
| GB | 1090036 | 11/1967 |
| GB | 2123014 | 1/1984 |
| JP | 75001156 | 1/1975 |
| JP | 75005735 | 3/1975 |
| JP | 75005751 | 3/1975 |
| JP | 75010196 | 4/1975 |
| JP | 62073943 | 4/1987 |
| JP | 7026123 | 1/1995 |
| JP | 09048908 | 2/1997 |
| JP | 9176461 | 7/1997 |
| JP | 9217012 | 8/1997 |
| JP | 10001608 | 1/1998 |
| JP | 10077427 | 3/1998 |
| JP | 10133013 | 5/1998 |
| JP | 10168305 | 6/1998 |
| WO | WO 84/03096 | 8/1984 |
| WO | WO 93/04117 | 3/1993 |
| WO | WO 93/04118 | 3/1993 |
| WO | WO 93/04125 | 3/1993 |
| WO | WO 93/11190 | 6/1993 |
| WO | WO 93/14922 | 8/1993 |
| WO | WO 94/11430 | 5/1994 |

| | | |
|---|---|---|
| WO | WO 94/29378 | 12/1994 |
| WO | WO 95/06090 | 3/1995 |
| WO | WO 95/14733 | 6/1995 |
| WO | WO 96/08526 | 3/1996 |
| WO | WO 96/25458 | 8/1996 |
| WO | WO 97/17398 | 5/1997 |
| WO | WO 97/30950 | 8/1997 |
| WO | WO 97/31057 | 8/1997 |
| WO | WO 97/31973 | 9/1997 |
| WO | WO 97/44384 | 11/1997 |
| WO | WO 98/01346 | 1/1998 |
| WO | WO 98/29499 | 7/1998 |
| WO | WO 98/53000 | 11/1998 |
| WO | WO 99/02593 | 1/1999 |
| WO | WO 99/15432 | 4/1999 |
| WO | WO 99/41299 | 8/1999 |
| WO | WO 0034378 | 6/2000 |
| WO | WO 0034393 | 6/2000 |

OTHER PUBLICATIONS

Yano et al., "Synthesis and properties of polyimide–clay hybrid," *ACS, Polymer Preprints*, 32, 65–66, (1991).

Fukushima et al., "Swelling Behavior of Montmorillonite by Poly–6–Amide," *Clay Minerals*, 23, 27–34 (1988).

Fukushima et al., "Synthesis of an Intercalated Compound of Montmorillonite and 6–Polyamide," *J. Inclusion Phenomena*, 5, 473–482 (1987).

Okada et al., "Synthesis and Characterization of a Nylon 6–Clay Hybrid," *ACS, Polymer Preprints*, 28, 447–448, (1987).

Fahn et al., "Reaction Products of Organic Dye Molecules with Acid–Treated Montmorillonite," *Clay Minerals*, 18, 447–458, (1983).

Greenland, "Adsorption of Polyvinyl Alcohols by Montmorillonite," *J. Colloid Sci.*, 18, 647–664 (1963).

* cited by examiner

POLYMETER/CLAY NANOCOMPOSITE COMPRISING A FUNCTIONALIZED POLYMER OR OLIGOMER AND A PROCESS FOR PREPARING SAME

RELATED APPLICATION

This application claims priority to provisional patent application Ser. No. 60/111,284, filed Dec. 7, 1998, which is incorporated herein by reference in its entirety.

FIELD OF THE INVENTION

This invention relates generally to a nanocomposite comprising a matrix polymer, a functionalized polymer or oligomer and a clay material. This invention also relates to articles produced from the nanocomposite and processes for producing the nanocomposite.

BACKGROUND OF THE INVENTION

There is much interest in layered, clay-based polymer nanocomposites because of the improved properties exhibited by the nanocomposites. It is desirable to maximize delamination of the platelet particles into individual platelets in order to maximize some property improvements, including barrier improvements, and to minimize deleterious effects on some properties including elongation-at-break. Ideally, the clay is exfoliated into particles with size less than about 100 nm in order to achieve clarity in the polymer that is comparable to the clay-free polymer. To date, the only polymer/clay nanocomposites that meet this expectation are prepared by incorporation of organically treated clays during synthesis of the polymer from monomer.

It is widely known, however, that the amount of clay that can be admixed in a polymer and still exhibit exfoliation of the layered clay is limited and some mechanical properties, such as elongation-at-break, are often reduced considerably upon the addition of the clay. Researchers recognized the value of inventing melt compounding processes that provide exfoliated polymer/platelet particle composites, namely more versatility of polymer choice and clay loading and the potential for cost savings. However, the melt compounding processes explored to date do not provide sufficient exfoliation of the platelet particles.

Polyesters such as poly(ethylene terephthalate) (PET) are widely used in bottles and containers which are used for carbonated beverages, fruit juices, and certain foods. Useful polyesters have high inherent viscosities (I.V.s) that allow polyesters to be formed into parisons and subsequently molded into containers. Because of the limited barrier properties with regard to oxygen, carbon dioxide and the like, PET containers are not generally used for products requiring long shelf life. For example, oxygen transmission into PET bottles that contain beer, wine and certain food products causes these products to spoil. There have been attempts to improve the barrier properties of PET containers by use of multilayer structures comprising one or more barrier layers and one or more structural layers of PET. However, multilayer structures have not found wide use and are not suitable for use as a container for beer due to the high cost, the large thickness of the barrier layer required, and poor adhesion of the barrier layer with the structural layer.

There are examples in the literature of polymer/clay nanocomposites prepared from monomers and treated clays. For example, U.S. Pat. No. 4,739,007 discloses the preparation of Nylon-6/clay nanocomposites from caprolactam and alkyl ammonium treated montmorillonite. U.S. Pat. No. 4,889,885 describes the polymerization of various vinyl monomers such as methyl methacrylate and isoprene in the presence of sodium montmorillonite Some patents describe the blending of up to 60 weight percent of intercalated clay materials with a wide range of polymers including polyamides, polyesters, polyurethanes, polyearbonates, polyolefins, vinyl polymers, thermosetting resins and the like. Such high loadings with modified clays are impractical and useless with most polymers because the melt viscosities of the blends increase so much that they cannot be molded.

WO 93/04117 discloses a wide range of polymers melt blended with up to 60 weight percent of dispersed platelet particles. WO 93/04118 discloses nanocomposite materials of a melt processable polymer and up to 60 weight percent of a clay that is intercalated with organic onium salts. The use of functionalized polymers in the melt blending operation is neither contemplated nor disclosed.

U.S. Pat. No. 5,552,469 describes the preparation of intercalates derived from certain clays and water-soluble polymers such as polyvinyl pyrrolidone, polyvinyl alcohol, and polyacrylic acid. Although the specification describes a wide range of thermoplastic resins including polyesters and rubbers that can be used in blends with these intercalates, there are no examples teaching how to make such blends. The use of ammonium containing materials is specifically excluded; thus, the use of ammonium functionalized polymers is neither contemplated nor disclosed.

The use of a hydroxy functionalized polypropylene oligomer and an organoclay in the preparation of a polypropylene/clay nanocomposite is disclosed by A. Usuki, M. Kato, T. Kurauchi, *J. Appl. Polym. Sci. Letters,* 15, 1481 (1996). The use of a maleic anhydride-modified polypropylene oligomer and a stearylammonium-intercalated clay in the preparation of a polypropylene/clay nanocomposite is disclosed by M. Kawasumi, N. Hasegawa, M. Kato, A. Usuki, and A. Okada, *Macromolecules,* 30, 6333 (1997). The use of ammonium-functionalized polymers or oligomers is neither contemplated nor disclosed.

JP Kokai patent no. 9-176461 discloses polyester bottles wherein the polyester contains unmodified sodium montmorillonite. Incorporation of the clay into the polyester by melt compounding is disclosed; however, the use of functionalized polymer was neither contemplated nor disclosed.

The following references are of interest with regard to chemically modified organoclay materials: U.S. Pat. Nos. 4,472,538; 4,546,126; 4,676,929; 4,739,007; 4,777,206; 4,810,734; 4,889,885; 4,894,411; 5,091,462; 5,102,948; 5,153,062; 5,164,440; 5,164,460; 5,248,720; 5,382,650; 5,385,776; 5,414,042; 5,552,469; WO Pat. Application Nos. 93/04117; 93/04118; 93/11190; 94/11430; 95/06090; 95/14733; D. J. Greenland, J. Colloid Sci. 18, 647 (1963); Y. Sugahara et al., J. Ceramic Society of Japan 100, 413 (1992); P. B. Massersmith et al., J. Polymer Sci.: Polymer Chem., 33, 1047 (1995); C. O. Sriakli et al., J. Mater. Chem. 6, 103(1996).

SUMMARY OF THE INVENTION

This invention seeks to meet the need for a melt compounding process that provides polymer/clay nanocomposites with sufficient exfoliation for improved properties and clarity for commercial applications, including film, bottles, and containers. The polymer nanocomposite materials of this invention are useful for forming packages that have improved gas barrier properties. Containers made from these polymer composite materials are ideally suited for protecting consumable products, such as foodstuffs, soft drinks, and medicines. This invention also seeks to provide a cost-effective method for producing layers with sufficient oxygen barrier and clarity for wide spread applications as multilayer bottles and containers, including beer bottles.

As embodied and broadly described herein, this invention, in one embodiment, relates to a polymer-clay nanocomposite comprising (i) a melt-processible matrix polymer, (ii) a layered clay material, and (iii) a matrix polymer-compatible functionalized oligomer or polymer.

In another embodiment, this invention relates to a polymer-clay nanocomposite comprising (i) a melt-processible matrix polymer, and incorporated therein (ii) a concentrate comprising a layered clay material and a matrix polymer-compatible functionalized oligomer or polymer.

In another embodiment, this invention comprises a process comprising the steps of (i) forming a concentrate comprising a layered clay material and a functionalized oligomer or polymer, and (ii) melt mixing the concentrate with a melt-processible matrix polymer to form a polymer-clay nanocomposite.

In yet another embodiment, this invention comprises a process comprising the step of melt mixing a layered clay material, a functionalized oligomer or polymer, and a melt-processible matrix polymer to form a polymer-clay nanocomposite material.

Additional advantages of the invention will be set forth in part in the detailed description, including the examples which follow, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory of preferred embodiments of the invention, and are not restrictive of the invention, as claimed.

DETAILED DESCRIPTION OF THE INVENTION

The present invention may be understood more readily by reference to the following detailed description of the invention and the examples provided therein. It is to be understood that this invention is not limited to the specific components, articles, processes and/or conditions described, as these may, of course, vary. It is also to be understood that the terminology used herein is for the purpose of describing particular embodiments only and is not intended to be limiting.

Definitions

It must also be noted that, as used in the specification and the appended claims, the singular forms "a," "an" and "the" include plural referents unless the context clearly dictates otherwise. For example, reference to an "article," "container" or "bottle" prepared from the nanocomposite and process of this invention is intended to include the processing of a plurality of articles, containers or bottles.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Whenever used in this specification, the terms set forth shall have the following meanings:

"Layered clay material," "layered clay," "layered material" or "clay material" shall mean any organic or inorganic material or mixtures thereof, such as a smectite clay mineral, which is in the form of a plurality of adjacent, bound layers. The layered clay comprises platelet particles and is typically swellable.

"Platelets," "platelet particles" or "particles" shall mean individual or aggregate unbound layers of the layered material. These layers may be in the form of individual platelet particles, ordered or disordered small aggregates of platelet particles (tactoids), and/or small aggregates of tactoids.

"Dispersion" or "dispersed" is a general term that refers to a variety of levels or degrees of separation of the platelet particles. The higher levels of dispersion include, but are not limited to "intercalated" and "exfoliated."

"Intercalated" or "intercalate" shall mean a layered clay material that includes treated or organically modified layered clay material having an increase in the interlayer spacing between adjacent platelets particles and/or tactoids. In the present invention, "intercalate" may refer to a concentrate of a clay material and a functionalized oligomer and/or polymer.

"Exfoliate" or "exfoliated" shall mean platelets dispersed mostly in an individual state throughout a carrier material, such as a matrix polymer. Typically, "exfoliated" is used to denote the highest degree of separation of platelet particles.

"Exfoliation" shall mean a process for forming an exfoliate from an intercalated or otherwise less dispersed state of separation.

"Nanocomposite(s)" or "nanocomposite composition(s)" shall mean a polymer or copolymer having dispersed therein a plurality of individual platelets obtained from a layered clay material.

"Matrix polymer," "bulk polymer" or "bulk matrix polymer" shall mean a thermoplastic or thermosetting polymer in which the clay material is dispersed to form a nanocomposite. In this invention, however, the platelet particles are predominantly exfoliated in the matrix polymer to form a nanocomposite.

Description of the Embodiments

This invention relates to a polymer/clay nanocomposite and to melt compounding processes for preparing a polymer/clay nanocomposite composition by combining a clay, a melt processible matrix polymer, and a functionalized oligomer or polymer.

More specifically, this invention relates to a polymer/clay nanocomposite or process to prepare a polymer/clay nanocomposite composition comprising an oligomer or polymer that contains an onium group, preferably an ammonium group. Without being bound by a particular theory, it is believed that the ammonium group on the oligomer or polymer provides a driving force for intercalation of the oligomer or polymer into the clay gallery, which disrupts the tactoid structure and swells the clay to permit intercalation by the bulk matrix polymer.

The prior art has defined the degree of separation of clay (platelet particles) based on peak intensity and basal spacing value, or lack of predominant basal spacing, as determined by X-ray analyses of polymer-platelet particle composites. Even though X-ray analysis alone often does not unambiguously predict whether the platelet particles are individually dispersed in the polymer, it can often allow quantification of the level of dispersion achieved. Basal spacing by X-ray diffraction indicates the separation distance of a platelet in a tactoid rather than single platelets. X-ray diffraction intensity (basal spacing peak height) may correlate to barrier in an article resulting from a nanocomposite including a clay material. For example, a low basal spacing peak height indicates few tactoids; therefore, the remainder must be either individual platelets or tactoids that are disordered.

Moreover, in polymer nanocomposites, X-ray analysis alone does not accurately predict either the dispersion of the platelet particles in the polymer or the resultant gas barrier improvement. TEM images of polymer-platelet composites show that platelet particles which are incorporated into at least one polymer exist in a variety of forms, including, but not limited to individual platelets (the exfoliated state), disordered agglomerates of platelets, well ordered or stacked aggregates of platelets (tactoids), swollen aggregates of stacked platelets (intercalated tactoids), and aggregates of tactoids.

Without being bound by any particular theory, it is believed that the degree of improved gas barrier (decreased permeability) depends upon the embodiment ratio of the resulting particle platelets and aggregates, the degree to which they are dispersed or uniformly distributed, and the degree to which they are ordered perpendicular to the flux of the permeant.

To obtain the improvements in gas permeability according to the present invention, it is preferable that the platelet particles representative of the bulk of the composite be exfoliated, and preferably be highly exfoliated, in the matrix polymer such that the majority, preferably at least about 75 percent and perhaps as much as at least about 90 percent or more of the platelet particles, be dispersed in the form of individual platelets and small aggregates having a thickness in the shortest dimension of less than about 30 nm and preferably less than about 10 nm, as estimated from TEM images. Polymer-platelet nanocomposites containing more individual platelets and fewer aggregates, ordered or disordered, are most preferred.

Significant levels of incomplete dispersion (i.e., the presence of large agglomerates and tactoids greater than about 30 nm) not only lead to an exponential reduction in the potential barrier improvements attributable to the platelet particles, but also can lead to deleterious affects to other properties inherent to polymer resins such as strength, toughness, heat resistance, and processability.

Again, without being bound by a particular theory, it is believed that delamination of platelet particles upon melt processing or mixing with a polymer requires favorable free energy of mixing, which has contributions from the enthalpy of mixing and the entropy of mixing. Melt processing clay with polymers results in a negative entropy of mixing due to the reduced number of conformations, which are accessible to a polymer chain when it resides in the region between two layers of clay. It is believed that poor dispersion is obtained using melt-processible polyesters, for example, because the enthalpy of mixing is not sufficient to overcome the negative entropy of mixing. In contrast, generally good dispersions are obtained with polyamides due to their hydrogen bonding character. However, the extent of this dispersion is frequently lessened because of the negative entropy of mixing.

Regarding the present invention, it has been found that processing a matrix polymer, a functionalized oligomer or polymer and a layered clay material gives a good dispersion of platelet particles in a resulting polymer nanocomposite, creating mostly individual platelet particles. The resulting nanocomposite has improved barrier to gas when formed into a wall or article compared to a neat polymer formed into the same or similar structure.

Polymers

Any melt-processible polymer or oligomer may be used in this invention. Illustrative of melt-processible polymers are polyesters, polyetheresters, polyamides, polyesteramides, polyurethanes, polyimides, polyetherimides, polyureas, polyamideimides, polyphenyleneoxides, phenoxy resins, epoxy resins, polyolefins, polyacrylates, polystyrenes, polyethylene-co-vinyl alcohols (EVOH), and the like or their combinations and blends. Although the preferred polymers are linear or nearly linear, polymers with other architectures, including branched, star, cross-linked and dendritic structures may be used if desired.

The preferred polymers include those materials that are suitable for use in the formation of monolayer and/or multilayer structures with polyesters, and include polyesters, polyamides, polyethylene-co-vinyl alcohols (such as EVOH), and similar or related polymers and/or copolymers. The preferred polyester is poly(ethylene terephthalate) (PET), or a copolymer thereof. The preferred polyamide is poly(m-xylylene adipamide) or a copolymer thereof.

Suitable polyesters include at least one dibasic acid and at least one glycol. A polyester of this invention may comprises the polycondensation polymerization reaction product (or residue) of the glycol component and the dicarboxylic acid component. "Residue," when used in reference to the components of the polyester of this invention, refers to the moiety that is the resulting product of the chemical species in a particular reaction scheme, or subsequent formulation or chemical product, regardless of whether the moiety is actually obtained from the chemical species.

The primary dibasic acids are terephthalic, isophthalic, naphthalenedicarboxylic, 1,4-cyclohexanedicarboxylic acid and the like. The various isomers of naphthalenedicarboxylic acid or mixtures of isomers may be used, but the 1,4-, 1,5, 2,6-, and 2,7-isomers are preferred. The 1,4-cyclohexanedicarboxylic acid may be in the form of cis, trans, or cis/trans mixtures. In addition to the acid forms, the lower alkyl esters or acid chlorides may be also be used.

A polyester of this invention may be prepared from one or more of the following dicarboxylic acids and one or more of the following glycols.

The dicarboxylic acid component of the polyester may optionally be modified with up to about 50 mole percent of one or more different dicarboxylic acids. Such additional dicarboxylic acids include dicarboxylic acids having from 6 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of suitable dicarboxylic acids include phthalic acid, isophthalic acid, terephthalic acid, naphthalene-2,6-dicarboxylic acid, cyclohexanedicarboxylic acid, cyclohexanediacetic acid, diphenyl-4,4'-dicarboxylic acid, phenylenedi(oxyacetic acid), succinic acid, glutaric acid, adipic acid, azelaic acid, sebacic acid, and the like. Polyesters may also be prepared from two or more of the above dicarboxylic acids.

Typical glycols used in the polyester include those containing from two to about ten carbon atoms. Preferred glycols include ethylene glycol, propanediol, 1,4-butanediol, 1,6-hexanediol, 1,4-cyclohexanedimethanol, diethylene glycol and the like. The glycol component may optionally be modified with up to about 50 mole percent, preferably up to about 25 mole percent, and more preferably up to about 15 mole percent of one or more different diols. Such additional diols include cycloaliphatic diols preferably having 6 to 20 carbon atoms or aliphatic diols preferably having 3 to 20 carbon atoms. Examples of such diols include: diethylene glycol, triethylene glycol, 1,4- cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(2-hydroxyethoxy)-benzene, 2,2b-is-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane and the like. Polyesters may also be prepared from two or more of the above diols.

Small amounts of multifunctional polyols such as trimethylolpropane, pentaerytlritol, glycerol and the like may be used, if desired. When using 1,4-cyclohexanedimethanol, it may be the cis, trans or cis/trans mixtures. When using phenylenedi(oxyacetic acid), it may be used as 1,2; 1,3; 1,4 isomers, or mixtures thereof.

The polymer may also contain small amounts of trifunctional or tetrafunctional comonomers to provide controlled branching in the polymers. Such comonomers include trimellitic anhydride, trimethylolpropane, pyromellitic dianhydride, pentaerythritol, trimellitic acid, trimellitic acid, pyromellitic acid and other polyester forming polyacids or polyols generally known in the art.

The polyesters of the present invention exhibit an I.V. of about 0.25 to about 1.5 dL/g, preferably about 0.4 to about 1.2 dL/g, and more preferably of about 0.7 to about 0.9 dL/g. The I.V. is measured at 25° C. in a 60/40 by weight mixture in phenol/tetrachloroethane at a concentration of 0.5 grams per 100 ml. Polyesters having an I.V. within the ranges specified above are of sufficiently high molecular weight to be used in the formation of the articles of the present invention.

Suitable polyamides include partially aromatic polyamides, aliphatic polyamides, wholly aromatic polyamides and/or mixtures thereof. By "partially aromatic polyamide," it is meant that the amide linkage of the partially aromatic polyamide contains at least one aromatic ring and a nonaromatic species. Suitable polyamides have an article forming molecular weight and preferably an I.V. of greater than 0.4.

Preferred wholly aromatic polyamides comprise in the molecule chain at least 70 mole % of structural units derived from m-xylylene diamine or a xylylene diamine mixture comprising m-xylylene diamine and up to 30% of p-xylylene diamine and an aliphatic dicarboxylic acid having 6 to 10 carbon atoms, which are further described in Japanese Patent Publications No. 1156/75, No. 5751/75, No. 5735/75 and No. 10196/75 and Japanese Patent Application Laid-Open Specification No. 29697/75.

Polyamides formed from isophthalic acid, terephthalic acid, cyclohexanedicarboxylic acid, meta- or para-xylylene diamine, 1,3- or 1,4-cyclohexane(bis)methylamine, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used. The low molecular weight polyamides may also contain small amounts of trifinctional or tetrafunctional comonomers such as trimellitic anhydride, pyromellitic dianhydride, or other polyamide forming polyacids and polyamines known in the art.

Preferred partially aromatic polyamides include, but are not limited to poly(m-xylylene adipamide), poly(m-xylylene adipamide-co-isophthalamide), poly(hexamethylene isophthalamide), poly(hexamethylene isophthalamide-co-terephthalamide), poly(hexamethylene adipamide-co-isophthalamide), poly(hexamethylene adipamide-co-terephthalamide), poly(hexamethylene isophthalamide-co-terephthalamide) and the like or mixtures thereof. More preferred partially aromatic polyamides include, but are not limited to poly(m-xylylene adipamide), poly(hexamethylene isophthalamide-co-terephthalamide), poly(m-xylylene adipamide-co-isophthalamide), and/or mixtures thereof. The most preferred partially aromatic polyamide is poly(m-xylylene adipamide).

Preferred aliphatic polyamides include, but are not limited to poly(hexamethylene adipamide) and poly(caprolactam). The most preferred aliphatic polyamide is poly(hexamethylene adipamide). Partially aromatic polyamides are preferred over the aliphatic polyamides where good thermal properties are crucial.

Preferred aliphatic polyamides include, but are not limited to polycapramide (nylon 6), poly-aminoheptanoic acid (nylon 7), poly-aminononanoic acid (nylon 9), polyundecaneamide (nylon 11), polyaurylactam (nylon 12), poly(ethylene-adipamide) (nylon 2,6), poly(tetramethylene-adipamide) (nylon 4,6), poly(hexamethylene-adipamide) (nylon 6,6), poly(hexamethylene-sebacamide) (nylon 6,10), poly(hexamethylene-dodecamide) (nylon 6,12), poly(octamethylene-adipamide) (nylon 8,6), poly(decamethylene-adipamide) (nylon 10,6), poly(dodecamethylene-adipamide) (nylon 12,6) and poly(dodecamethylene-sebacamide) (nylon 12,8).

The most preferred polyamides include poly(m-xylylene adipamide), polycapramide (nylon 6) and poly(hexamethylene-adipamide) (nylon 6,6). Poly(m-xylylene adipamide) is a preferred polyamide due to its availability, high barrier, and processability.

The polyamides are generally prepared by processes which are well known in the art.

A polyamide of the present invention may comprise the polycondensation polymerization reaction product (or residue) of a diamine component and a dicarboxylic acid component, and/or those prepared by ring opening polymerization of lactams. "Residue," when used in reference to the components of the polyamide of this invention, refers to the moiety that is the resulting product of the chemical species in a particular reaction scheme, or subsequent formulation or chemical product, regardless of whether the moiety is actually obtained from the chemical species.

The polyamides of the present invention exhibit an I.V. of about 0.25 to about 1.5 dL/g, preferably about 0.4 to about 1.2 dL/g, and more preferably of about 0.7 to about 0.9 dL/g. The I.V. is measured at 25° C. in a 60/40 by weight mixture in phenol/tetrachloroethane at a concentration of 0.5 grams per 100 ml. Polyamides having an I.V. within the ranges specified above are of sufficiently high molecular weight to be used in the formation of the articles of the present invention.

The nanocomposite of the present invention also comprises a functionalized oligomer or polymer. By "functionalized", what is meant is that the oligomer or polymer preferably contains a functional group that provides for increased intercalation of a clay material. Preferably, the functional group of the functionalized oligomer or polymer is an onium group, more preferably an ammonium group. It is preferred, but not required, that the onium group be positioned at or near the chain end of the polymer or oligomer. As stated above and without being bound by a particular theory, it is believed that the onium group on the oligomer or polymer provides a driving force for intercalation of the oligomer or polymer into the clay gallery, which disrupts the tactoid structure and swells the clay to permit intercalation by the bulk matrix polymer.

The I.V. of a functionalized oligomeric polyester prior to melt mixing is preferably from about 0.05 and 0.5 dL/g, and more preferably from 0.1 dL/g to 0.3 dL/g as measured in a mixture of 60 weight percent phenol and 40 weight percent 1,1,2,2-tetrachloroethane at a concentration of 0.5 g/100 ml (solvent) at 25° C. Moreover, the oligomeric polyester has a number average molecular weight of from about 200 to about 12,000 g/mol and may be a homo or cooligomer.

The I.V. of a functionalized oligomeric polyamide prior to melt mixing is preferably from about 0.1 and 0.5 dL/g, and more preferably from 0.3 dL/g to 0.5 dL/g as measured in a mixture of 60 weight percent phenol and 40 weight percent 1,1,2,2-tetrachloroethane at a concentration of 0.5 g/100 ml (solvent) at 25° C. Moreover, the oligomeric polyamide has a number average molecular weight of from about 200 to about 12,000 g/mol and may be a homo or cooligomer.

It is preferred, but not required, that a ammonium-functionalized polymer or oligomer have a number average molecular weight or inherent viscosity that is less than that of the matrix polymer. The ammonium-functionalized polymer or oligomer may comprise the same or different repeating units as that of the matrix polymer, provided that the ammonium-functionalized polymer or oligomer is sufficiently compatible with the matrix polymer to permit attainment of the desired properties. One or more ammonium groups may be present on the ammonium-functionalized polymer or oligomer. It is preferred, but not required, that the ammonium group be positioned at or near the chain end of the polymer or oligomer.

Although not necessarily preferred, the oligomers and/or polymers of the present invention may also include suitable additives normally used in polymers. Such additives may be employed in conventional amounts and may be added directly to the reaction forming the functionalized polymer or oligomer or to the matrix polymer. Illustrative of such additives known in the art are colorants, pigments, carbon black, glass fibers, fillers, impact modifiers, antioxidants, stabilizers, flame retardants, reheat aids, crystallization aids, acetaldehyde reducing compounds, recycling release aids, oxygen scavengers, plasticizers, nucleators, mold release agents, compatibilizers, and the like, or their combinations.

All of these additives and many others and their use are known in the art and do not require extensive discussion. Therefore, only a limited number will be referred to, it being understood that any of these compounds can be used in any combination so long as they do not hinder the present invention from accomplishing its objects.

Clay Materials (Platelet Particles)

The nanocomposite composition of the present invention comprises less than about 25 weight percent, preferably from about 0.5 to about 20 weight percent, more preferably from about 0.5 to about 15 weight percent, and most preferably from about 0.5 to about 10 weight percent of layered clay material. The layered clay material comprises platelet particles. The amount of platelet particles is determined by measuring the amount of silicate residue in the ash of the polymer/platelet composition when treated in accordance with ASTM D5630-94.

Useful clay materials include natural, synthetic, and modified phyllosilicates. Natural clays include smectite clays, such as montmorillonite, saponite, hectorite, mica, vermiculite, bentonite, nontronite, beidellite, volkonskoite, saponite, magadite, kenyaite, and the like. Synthetic clays include synthetic mica, synthetic saponite, synthetic hectorite, and the like. Modified clays include fluoronated montmorillonite, fluoronated mica, and the like. Suitable clays are available from various companies including Nanocor, Inc., Southern Clay Products, Kunimine Industries, Ltd., and Rheox.

Generally, the layered clay materials useful in this invention are an agglomeration of individual platelet particles that are closely stacked together like cards, in domains called tactoids. The individual platelet particles of the clays preferably have thickness of less than about 2 nm and diameter in the range of about 10 to about 3000 nm.

Preferably, the clays are dispersed in the polymer(s) so that most of the clay material exists as individual platelet particles, small tactoids, and small aggregates of tactoids. Preferably, a majority of the tactoids and aggregates in the polymer/clay nanocomposites of the present invention will have thickness in its smallest dimension of less than about 20 nm. Polymer/clay nanocomposite compositions with the higher concentration of individual platelet particles and fewer tactoids or aggregates are preferred.

Moreover, the layered clay materials are typically swellable free flowing powders having a cation exchange capacity from about 0.3 to about 3.0 milliequivalents per gram of mineral (meq/g), preferably from about 0.90 to about 1.5 meq/g, and more preferably from about 0.95 to about 1.25 meq/g. The clay may have a wide variety of exchangeable cations present in the galleries between the layers of the clay, including, but not limited to cations comprising the alkaline metals (group IA), the alkaline earth metals (group IIA), and their mixtures. The most preferred cation is sodium; however, any cation or combination of cations may be used provided that most of the cations may be exchanged for organic cations (onium ions). The exchange may occur by treating a individual clay or a mixture of clays with organic cations.

Preferred clay materials are phyllosilicates of the 2:1 type having a cation exchange capacity of 0.5 to 2.0 meq/g. The most preferred clay materials are smectite clay minerals, particularly bentonite or montmorillonite, more particularly Wyoming-type sodium montinorillonite or Wyoming-type sodium bentonite having a cation exchange capacity from about 0.95 to about 1.25 meq/g.

Other non-clay materials having the above-described ion-exchange capacity and size, such as chalcogens, may also be used as a source of platelet particles under the present invention. Chalcogens are salts of a heavy metal and group VIA (O, S, Se, and Te). These materials are known in the art and do not need to be described in detail here.

Improvements in gas barrier result from increases in the concentration of platelet particles in the polymer. While amounts of platelet particles as low as 0.01 percent provide improved barrier (especially when well dispersed and ordered), compositions having at least about 0.5 weight percent of the platelet particles are preferred because they display the desired improvements in gas permeability.

Prior to incorporation into the oligomer(s) or polymer(s), the particle size of the clay material is reduced in size by methods known in the art, including, but not limited to, grinding, pulverizing, hammer milling, jet milling, and their combinations. It is preferred that the average particle size be reduced to less than 100 micron in diameter, more preferably less than 50 micron in diameter, and most preferably less than 20 micron in diameter.

The clay material of this invention may comprise refined but unmodified clays, modified clays or mixtures of modified and unmodified clays. Generally, it is desirable to treat the selected clay material to facilitate separation of the agglomerates of platelet particles to individual platelet particles and small tactoids. Separating the platelet particles prior to incorporation into the polymer also improves the polymer/platelet interface. Any treatment that achieves the above goals may be used. Many clay treatments used to modify the clay for the purpose of improving dispersion of clay materials are known and may be used in the practice of this invention. The clay treatments may be conducted prior to, during, or after mixing the clay material with the polymer.

Organic Cations

In an embodiment of this invention, a modified or treated layered clay material is prepared by the reaction of a swellable layered clay with an organic cation (to effect partial or complete cation exchange), preferably an ammonium compound. If desired, two or more organic cations may be used to treat the clay. Moreover, mixtures of organic cations may also be used to prepare a treated layered clay material. The process to prepare the organoclays (modified or treated clays) may be conducted in a batch, semi-batch, or continuous manner.

Organic cations used to modify a clay material or a mixture of clay materials of a nanocomposite of this invention are derived from organic cation salts, preferably onium salt compounds. Organic cation salts useful for the nanocomposite and process of this invention may generally be represented by the following formula (I):

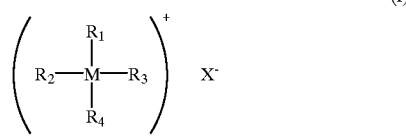

(I)

wherein M is either nitrogen or phosphorous; $X^-$ is a halide, hydroxide, or acetate anion, preferably chloride and bromide; and $R_1$, $R_2$, $R_3$, and $R_4$ are independently organic and/or oligomeric ligands or may be hydrogen.

Examples of useful organic ligands include, but are not limited to, linear or branched alkyl groups having 1 to 22 carbon atoms, aralkyl groups which are benzyl and substituted benzyl moieties including fused-ring moieties having linear chains or branches of 1 to 100 carbon atoms in the alkyl portion of the structure, aryl groups such as phenyl and substituted phenyl including fused-ring aromatic substituents, beta, gamma unsaturated groups having six or less carbon atoms, and alkyleneoxide groups having repeating units comprising 2 to 6 carbon atoms. Examples of useful oligomeric ligands include, but are not limited to poly(alkylene oxide), polystyrene, polyacrylate, polycaprolactone, and the like.

Examples of useful organic cations include, but are not limited to alkyl ammonium ions, such as tetramethyl ammonium, hexyl ammonium, butyl ammonium, bis(2-hydroxyethyl) dimethyl ammonium, hexyl benzyl dimethyl ammonium, benzyl trimethyl ammonium, butyl benzyl dimethyl ammonium, tetrabutyl ammonium, di(2-hydroxyethyl) ammonium, and the like, and alkyl phosphonium ions such as tetrabutyl phosphonium, trioctyl octadecyl phosphonium, tetraoctyl phosphonium, octadecyl triphenyl phosphonium, and the like or mixtures thereof.

Other particularly useful organic cations for this invention include, but are not limited to alkyl ammonium ions such as dodecyl ammonium, octadecyl trimethyl ammonium, bis(2-hydroxyethyl) octadecyl methyl ammonium, octadecyl benzyl dimethyl ammnonium, and the like or mixtures thereof.

Illustrative examples of suitable polyalkoxylated ammonium compounds include the hydrochloride salts of polyalkoxylated amines such as JEFFAMINE (of Huntsman Chemical), namely, JEFFAMINE-506 and JEFFAMINE 505, and an amine available under the trade name ETHOMEEN (of Akzo Chemie America), namely, ETHOMEEN 18/25, which is octadecyl bis(polyoxyethylene[15])amine, wherein the numbers in brackets refer to the total number of ethylene oxide units. A further illustrative example of a suitable polyalkoxylated ammonium compound is ETHOQUAD 18/25 (of Akzo Chemie America), which is octadecyl methyl bis(polyoxyethylene[15]) ammonium chloride, wherein the numbers in brackets refer to the total number of ethylene oxide units.

Numerous methods to modify layered clays with organic cations are known, and any of these may be used in the practice of this invention. One embodiment of this invention is the organic modification of a layered clay with an organic cation salt by the process of dispersing a layered clay or mixture of clays into hot water, most preferably from 50 to 80° C., adding the organic cation salt separately or adding a mixture of the organic cation salts (neat or dissolved in water or alcohol) with agitation, then blending for a period of time sufficient for the organic cations to exchange most of the metal cations present in the galleries between the layers of the clay material(s). Then, the organically modified layered clay material(s) is isolated by methods known in the art including, but not limited to, filtration, centrifugation, spray drying, and their combinations.

It is desirable to use a sufficient amount of the organic cation salt(s) to permit exchange of most of the metal cations in the galleries of the layered particle for the organic cation(s); therefore, at least about 0.5 equivalent of total organic cation salt is used and up to about 3 equivalents of organic cation salt can be used. It is preferred that about 0.5 to 2 equivalents of organic cation salt be used, more preferable about 1.0 to 1.5 equivalents. It is desirable, but not required to remove most of the metal cation salt(s) and most of the excess organic cation salt(s) by washing and other techniques known in the art.

Other Clay Treatments

The clay may be further treated for the purposes of aiding exfoliation in the composite and/or improving the strength of the polymer/clay interface. Any treatment that achieves the above goals may be used. Examples of useful treatments include intercalation with water-soluble or water-insoluble polymers, organic reagents or monomers, silane compounds, metals or organometallics, and/or their combinations. Treatment of the clay can be accomplished prior to the addition of a polymer to the clay material, during the dispersion of the clay with the polymer or during a subsequent melt blending or melt fabrication step.

Examples of useful pretreatment with polymers and oligomers include those disclosed in U.S. Pat. Nos. 5,552,469 and 5,578,672, incorporated herein by reference. Examples of useful polymers for treating the clay material include polyvinyl pyrrolidone, polyvinyl alcohol, polyethylene glycol, polytetrahydrofuran, polystyrene, polycaprolactone, certain water-dispersible polyesters, Nylon-6 and the like.

Examples of useful pretreatment with organic reagents and monomers include those disclosed in EP 780,340 A1, incorporated herein by reference. Examples of useful organic reagents and monomers for intercalating the swellable layered clay include dodecylpyrrolidone, caprolactone, caprolactam, ethylene carbonate, ethylene glycol, bishydroxyethyl terephthalate, dimethyl terephthalate, and the like or mixtures thereof.

Examples of useful pretreatment with silane compounds include those treatments disclosed in WO 93/11190, incorporated herein by reference. Examples of useful silane compounds includes (3-glycidoxypropyl)trimethoxysilane, 2-methoxy(polyethyleneoxy)propyl heptamethyl trisiloxane, octadecyl dimethyl (3-trimethoxysilylpropyl) ammonium chloride and the like.

If desired, a dispersing aid may be present during or prior to the formation of the composite for the purposes of aiding exfoliation of the treated or untreated swellable layered particles into the polymer. Many such dispersing aids are known and cover a wide range of materials including water, alcohols, ketones, aldehydes, chlorinated solvents, hydrocarbon solvents, aromatic solvents, and the like or combinations thereof.

It should be appreciated that on a total composition basis, dispersing aids and/or pretreatment compounds may account for significant amount of the total composition, in some cases up to about 30 weight percent. While it is preferred to use as little dispersing aid/pretreatment compound as possible, the amounts of dispersing aids and/or pretreatment compounds may be as much as about 8 times the amount of the platelet particles.

Articles

The polymer-clay nanocomposite of this invention may be formed into articles by conventional plastic processing techniques. Molded articles may be made from the above-described polymers by compression molding, blow molding, or other such molding techniques, all of which are known in the art. Monolayer and/or multilayer articles prepared from the nanocomposite material of this invention include, but are not limited to film, sheet, pipes, tubes, profiles, molded articles, preforms, stretch blow molded films and containers, injection blow molded containers, extrusion blow molded films and containers, thermoformed articles and the like. The containers are preferably bottles.

The bottles and containers of this invention provide increased shelf storage life for contents, including beverages and food that are sensitive to the permeation of gases. Articles, more preferably containers, of the present invention often display a gas transmission or permeability rate (oxygen, carbon dioxide, water vapor) of at least 10% lower (depending on clay concentration) than that of similar containers made from clay-free polymer, resulting in correspondingly longer product shelf life provided by the container. Desirable values for the sidewall modulus and tensile strength may also be maintained. The articles also show unexpected resistance to haze formation, crystallization, and other defect formation.

The articles may also be multilayered. Preferably, the multilayered articles have a nanocomposite material disposed intermediate to other layers, although the nanocomposite may also be one layer of a two-layered article. In embodiments where the nanocomposite and its components are approved for food contact, the nanocomposite may form the food contact layer of the desired articles. In other embodiments, it is preferred that the nanocomposite be in a layer other than the food contact layer.

The multilayer articles may also contain one or more layers of the nanocomposite composition of this invention and one or more layers of a structural polymer. A wide variety of structural polymers may be used. Illustrative of structural polymers are polyesters, polyetheresters, polyamides, polyesteramides, polyurethanes, polyimides, polyetherimides, polyureas, polyamideimides, polyphenyleneoxides, phenoxy resins, epoxy resins, polyolefins, polyacrylates, polystyrene, polyethylene-co-vinyl alcohols (EVOH), and the like or their combinations and blends. The preferred structural polymers are polyesters, such as poly(ethylene terephthalate) and its copolymers.

In another embodiment, co-extruding a layer of the polymer-clay nanocomposite specified above with some other suitable thermoplastic resin may form articles. The polymer-clay nanocomposite and the molded article and/or extruded sheet may also be formed at the same time by co-injection molding or co-extruding.

Another embodiment of this invention is the combined use of silicate layers uniformly dispersed in the matrix of a high barrier thermoplastic together with the multilayer approach to packaging materials. By using a layered clay to decrease the gas permeability in the high barrier layer, the amount of this material that is needed to generate a specific barrier level in the end application is greatly reduced.

Since the high barrier material is often the most expensive component in multilayer packaging, a reduction in the amount of this material used can be quite beneficial. With the polymer-clay nanocomposite layer being sandwiched between two outer polymer layers, the surface roughness is often considerably less than for a monolayer nanocomposite material. Thus, with a multilayer approach, the level of haze may be further reduced.

Processes

The polymer/clay nanocomposites of this invention may be prepared with the matrix polymer, functionalized oligomer or polymer and layered clay material in different ways.

In one embodiment of this invention, a polymer or oligomer comprising an ammonium group is prepared. Then, a concentrate is prepared by melt compounding, by methods known in the art, 20–99.5 weight percent, preferably 40–95 weight percent, of the ammonium-functionalized polymer or oligomer with 0.5–80 weight percent, preferably 0.5–60 weight percent, of the desired clay. Then, the final nanocomposite is prepared by melt compounding, by methods known in the art, 1–50 weight percent of the concentrate with 50–99 weight percent of a matrix polymer. The melt compounding steps may be performed separately or sequentially. That is, the concentrate may be either used immediately while in the molten form or may be solidified and used at a later time.

In another embodiment of this invention, a concentrate of 0.5–80 weight percent of clay intercalated with 20–99.5 weight percent of an ammonium-functionalized polymer or oligomer is prepared in water or a mixture of water and one or more water-miscible organic solvents, including alcohols, ethers, acids, and nitrites. Illustrative of water-miscible organic solvents are dioxane, tetrahydrofuran, methanol, ethanol, isopropanol, acetic acid, acetonitrile, and the like or mixtures thereof. Then, the final nanocomposite is prepared by melt compounding 1–50 weight percent of the concentrate with 50–99 weight percent of a polymer by methods known in the art. The melt compounding steps may be performed separately or sequentially. That is, the concentrate may be either used immediately while in the molten form or may be solidified and used at a later time.

In another embodiment of this invention, the nanocomposite is prepared in a single extrusion, by methods known in the art, using up to 0.5–25 weight percent of the ammonium-functionalized polymer or oligomer, 50–99 weight percent of the desired polymer, and 0.5–25 weight percent of the desired clay.

In yet another embodiment of this invention, a polymer is prepared or modified such that a minor amount of the polymer chains comprise an ammonium group. Then, 75–99.5 weight percent of this partially ammonium-functionalized polymer material is melt compounded, by methods known in the art, with 0.5–25 weight percent of the desired clay material.

In still another embodiment of this invention, an ammonium-functionalized polymer or oligomer is melt blended with a matrix polymer, and then the blend is melt compounded with clay.

Melt processing or mixing includes melt and extrusion compounding. Use of extrusion compounding to mix clay and a polymer presents advantages. Chiefly, the extruder is able to handle the high viscosity exhibited by the nanocomposite material. In addition, in a melt mixing approach for producing nanocomposite materials, the use of solvents can be avoided. Low molecular weight liquids can often be costly to remove from the nanocomposite resin.

A low molecular weight oligomer, for example, is found to be very effective at dispersing an organo or other suitable modified clay, preferably smectic clay, as a concentrate when melt mixed. Desirable values for the I.V. or molecular weight of the functionalized oligomer or polymer depends on factors including the oligomer and clay selected and is readily determined by those skilled in the art.

If desired, a dispersing aid may be present during or prior to the formation of the composite by melt mixing for the purposes of aiding exfoliation of the treated or untreated swellable layered particles into the polymer. Many such dispersing aids are known covering a wide range of materials including water, alcohols, ketones, aldehydes, chlorinated solvents, hydrocarbon solvents, aromatic solvents, and the like or combinations thereof.

The molecular weight of the polymer material may be increased by any of a number of known approaches or by any combination of these approaches, e.g., chain extension, reactive extrusion, extrusion let-down, solid state polymerization or annealing, annealing under a flow of inert gas, vacuum annealing, let-down in a melt reactor, etc.

Although any melt mixing device may be used, typically, melt mixing is conducted either by a batch mixing process or by a melt compounding extrusion process during which treated or untreated layered clay particles are introduced into an oligomeric or polymeric resin. Prior to melt mixing, the treated or untreated layered particles may exist in various forms including pellets, flakes, chips and powder. It is preferred that the treated or untreated layered particles be reduced in size by methods known in the art, such as hammer milling and jet milling. Prior to melt mixing, the oligomeric or polymeric resin may exist in wide variety of forms including pellets, ground chips, powder or its molten state.

Melt mixing may also be achieved by dry mixing an functionalized oligomeric resin with treated or untreated layered particles then passing the mixture through a compounding extruder under conditions sufficient to melt the oligomeric resin. Further, melt mixing may be conducted by feeding the functionalized oligomeric resin and treated or untreated layered particles separately into a compounding extruder. When treated layered particles are used in this process, it is preferred that the oligomeric resin be added first to minimize degradation of treated layered particles.

In yet another embodiment involving the melt mixing of a functionalized oligomer, a high concentration of layered particles is melt mixed with oligomeric resin by mixing in a reactor. The resulting composite material is then either chain extended, polymerized to high molecular weight, or let down in the extruder into a high molecular weight polymer to obtain the final nanocomposite material.

As exemplified above, the clay, the ammonium-functionalized polymer or oligomer, and the matrix polymer components of the nanocomposite of this invention may be combined in a wide variety of ways that are known to those skilled in the art. Therefore, it will be apparent to those skilled in the art that various modifications and variations can be made to the processes embodied above without departing from the scope of the invention. Other embodiments of the invention will be apparent to those skilled in the art from consideration of the specification and practice of the invention disclosed herein. It is intended that the description of the above embodiments not be limiting.

The functionalized oligomer or polymer and the high molecular weight matrix polymer may have the same or different repeat unit structure, i.e., may be comprised of the same or different monomer units. Preferably, the functionalized oligomer or polymer has the same monomer unit to enhance compatibility or miscibility with the high molecular weight matrix polymer.

The resulting nanocomposite can then be processed into the desired barrier article, film or container with article-forming methods well known in the art. For example, the nanocomposite may then be processed either as an injected molded article, e.g., a container preform or an extruded film or sheet. Additional processing of stretch blow molding to a container or extruding as a barrier film yields transparent high barrier finished articles. Polymer nanocomposites and articles produced according to the present invention display a gas permeability, which is at least 10 percent lower than that of the unmodified polymer.

EXAMPLES

The following examples and experimental results are included to provide those of ordinary skill in the art with a complete disclosure and description of particular manners in which the present invention can be practiced and evaluated, and are intended to be purely exemplary of the invention and are not intended to limit the scope of what the inventors regard as their invention. Efforts have been made to ensure accuracy with respect to numbers (e.g., amounts, temperature, etc.); however, some errors and deviations may have occurred. Unless indicated otherwise, parts are parts by weight, temperature is in °C. or is at ambient temperature, and pressure is at or near atmospheric.

Example 1

This example illustrates the preparation of amine functionalized polyesters by aminolysis of an oligomeric poly (caprolactone).

200 grams (about 0.1 moles) of polycaprolactone, with number average molecular weight of about 2000 available from Aldrich, and 30 grams (0.30 moles) of 2,2-dimethyl-1,3-propanediamine were heated with stirring at 200 C. for 90 minutes and at 220 C. for 30 minutes in a 500-mL 3-neck round-bottom flask equipped with stirrer, condenser, and nitrogen inlet. The resulting liquid resin was poured into a can. Titration of a small sample indicated that the amine content in the sample is 2.08 meq/g, and molecular weight analysis indicated a significant decrease in molecular weight. 20 grams of the product was stirred in 160 ml of 60 C. water, and the ammonium form was prepared by adding 10 meq of hydrochloric acid in 10 ml of water.

6.36 g (6.14 meq of exchangeable sodium) of refined Wyoming type sodium montmorillonite with cation exchange capacity of 0.95 meq/g available from Southern Clay Products was dispersed in 500 ml of 70 C. water in a Vitamix blender. Then 3.07 g (6.14 meq of ammonium) of the ammonium functionalized polycaprolactone in 150 ml of water was added. The mixture was then blended, filtered, washed with 500 ml of water twice in the Vitamix blender, then dried in an oven at 60 C. The volume average particle size of the clay material was reduced to less than 10 microns by hammer milling then jet milling. The resulting concentrate of clay and ammonium functionalized polycaprolactone was determined to have a WAXS basal spacing of 1.4 nm.

Example 2

The procedure of Example 1 was repeated except that, PETG 6763, which is poly(ethylene-co-1,4-cyclohxanedimethylene terephthalate) with IV of 0.75 dL/g available from Eastman Chemical Company, was used instead of polycaprolactone, and the temperature was increased to 225 C.

Example 3

The procedure of Example 2 was repeated except that AQ 55, which is a water dispersible melt processible polyester available from Eastman Chemical Company, was used in place of PETG 6763.

Example 4

The procedure of Example 2 was repeated except that oligomeric ethylene adipate) was used in place of polycaprolactone.

Examples 5–18

The above procedure was repeated using the following polyesters and es in the molar ratio indicated in Table 1 below.

TABLE 1

| Ex | Polyester | Amine | Moles of Amine per mole of Polyester | I.V. of Amine Functionalized Polyester (dL/g) | Basal Spacing of Clay Concentrate (nm) |
|---|---|---|---|---|---|
| 5 | PETG 6763 | Dimethylethanolamine | 0.17 | 0.10 | 1.4 |
| 6 | PETG 6763 | Dimethylethanolamine | 0.44 | 0.12 | 1.4 |
| 7 | PETG 6763 | Dimethylaminopropylamine | 0.17 | 0.28 | 1.3 |
| 8 | PETG 6763 | Dimethylaminopropylamine | 0.44 | 0.10 | 1.4 |
| 9 | AQ 55 | Dimethylethanolamine | 0.17 | 0.13 | |
| 10 | AQ 55 | Dimethylethanolamine | 0.44 | 0.08 | 1.4 |
| 11 | AQ 55 | Dimethylaminopropylamine | 0.17 | 0.23 | 1.5 |
| 12 | AQ 55 | Dimethylaminopropylamine | 0.44 | 0.11 | |
| 13 | Polycaprolactone | Dimethylethanolamine | 0.17 | 0.19 | 1.5 |
| 14 | Polycaprolactone | Dimethylethanolamine | 0.44 | 0.15 | 1.4 |
| 15 | Polycaprolactone | Dimethylaminopropylamine | 0.17 | 0.15 | 1.8 |
| 16 | Polycaprolactone | Dimethylaminopropylamine | 0.44 | 0.10 | 3.3 |
| 17 | Polyethylene adipate | Dimethylethanolamine | 0.50 | | 2.0 |
| 18 | Polyethylene adipate | Dimethylethanolamine | 0.50 | | 2.1 |

Example 19

A dimethylamine terminated oligomeric polystyrene was prepared by anionic polymerization of styrene using 3-(dimethylamino)propyl lithium as the initiator using vacuum line conditions with a complex solvent mixture of cyclohexane, benzene, and tetrahydrofuran. The number average molecular weight of the dimethylamine-terminated polystyrene was determined to be about 700 by MALDI-TOF.

6.6 grams of the above material was dissolved in 290 ml of dioxane then 10 g of 0.97 N hydrochloric acid was added to give the ammonium form of the oligomeric polystyrene. 10 grams of refined Wyoming type sodium montinorillonite with cation exchange capacity of 0.95 meq/g available from Southern Clay Products was dispersed in a 70 C. mixture of 90 ml of water and 110 ml of dioxane in a blender. The solution of the ammonium-functionalized polystyrene was added to the blender. The mixture was then blended, filtered, washed once with dioxane and once with water, then dried in an oven at 60 C. The volume average particle size of the clay material was reduced to less than 10 microns by hammer milling then jet milling. The resulting concentrate of clay and ammonium functionalized polystyrene was determined to have a WAXS basal spacing of 1.8 nm.

Example 20

The concentrates prepared in Examples 1–19 are dry mixed with PET 9921, dried overnight, then extruded on a Leistritz Micro-18 twin-screw extruder at 280° C. The extruded strand is air cooled and chopped into pellets. The pellets are dried in a vacuum oven overnight then extruded into film using a 1-inch Kilion single screw extruder with a 4-inch film dye. Oxygen permeability measurements of the film on a Mocon Oxatran 1000 show a significant reduction compared to film of PET 9921.

Example 21

A dimethylamine terminated oligomeric polystyrene was prepared by anionic polymerization of styrene using 3-(dimethylamino)propyl lithium as the initiator using vacuum line conditions with a complex solvent mixture of cyclohexane, benzene, and tetrahydrofuran. The number average molecular weight of the dimethylamine-terminated polystyrene was determined to be about 1200 by MALDI-TOF. The dimethylammonium terminated oligomeric polystyrene was prepared by treating the dimethylamine terminated oligomeric polystyrene with 1 equivalent of hydrochloric acid in a mixture of dioxane and water, concentrating the solvent, then precipitating the product by adding a large amount of isopropanol.

120 g of the above ammonium functionalized oligomeric polystyrene, 8 g of an octadecyltrimethyl ammonium intercalated montmorillonite with volume average particle size of about 10–15 microns from Nanocor, and 872 g of polystyrene, are dry blended, dried in a vacuum oven at 100° C. overnight, then extruded on a Leistritz Micro-18 twin-screw extruder at 200° C. The extruded strand is air cooled and chopped into pellets.

700 g of the above pellets is dried in a vacuum oven overnight at 100 C. then extruded into film. Oxygen permeability measurements on a Mocon Oxatran 1000 show a significant reduction compared to a clay-free control.

Example 22

An amine functionalized polyethylene-co-vinyl acetate is prepared using an amine-functionalized initiator. Then, the ammonium functionalized polyethylene-co-vinyl alcohol is prepared by hydrolysis of the amine functionalized polyethylene-co-vinyl acetate.

120 g of the above ammonium functionalized polyethylene-co-vinyl alcohol, 7 g of a refined sodium montmorillonite with volume average particle size of about 10–15 microns available from Nanocor, and 873 g of Eval F101A, which is a polyethylene-co-vinyl alcohol available from Eval Company U.S.A., are dry blended, dried in a vacuum oven at 100° C. overnight, then extruded on a Leistritz Micro-18 twin-screw extruder at 200° C. The extruded strand is air cooled and chopped into pellets.

700 g of the above pellets is dried in a vacuum oven overnight then extruded into trilayer film with two outside layers of PET-9921. 2-inch square samples of the film are oriented 4×4 in a T. M. Long instrument. Oxygen permeability measurements on a Mocon Oxatran 2/20 show a significant reduction compared to a clay-free control.

Example 23

An amine functionalized terpolymer comprising 33 mole percent of ethylene, 62 mole percent of vinyl acetate, and 5 mole percent of 6-(N,N-dimethylamino)hexyl vinyl ether is prepared. Then, this material is converted into an ammonium functionalized polyethylene-co-vinyl alcohol by hydrolysis of the terpolymer.

120 g of the above ammonium functionalized polyethylene-co-vinyl alcohol, 7 g of a refined sodium montmorillonite with volume average particle size of about 10–15 microns available from Nanocor, and 873 g of Eval F101A, which is a polyethylene-co-vinyl alcohol available from Eval Company U.S.A., are dry blended, dried in a vacuum oven at 100° C. overnight, then extruded on a Leistritz Micro-18 twin-screw extruder at 200° C. The extruded strand is air cooled and chopped into pellets.

700 g of the above pellets is dried in a vacuum oven overnight then extruded into trilayer film with two outside layers of PET-9921. 2-inch square samples of the film are oriented 4×4 in a T. M. Long instrument. Oxygen permeability measurements on a Mocon Oxatran 2/20 show a significant reduction compared to a clay-free control.

Example 24

An ammonium functionalized poly(meta-xylylene adipamide) is prepared from 6-(trimethylammonium) hexanoic acid, adipic acid, and meta-xylylenediamine. 120 g of the ammonium functionalized poly(meta-xylylene adipamide), 8 g of an octadecylammonium intercalated montmorillonite from Nanocor, Inc., and 872 g of MxD6 6007 polyamide from Mitsubishi Gas, are dry blended, dried in a vacuum oven at 110° C. overnight, then extruded on a Leistritz Micro-18 twin-screw extruder at 280° C. The extruded strand is air cooled and chopped into pellets.

700 g of the above pellets is crystallized then dried in a vacuum oven overnight then extruded into trilayer film with two outside layers of PET-9921. 2-inch square samples of the film are oriented 4×4 in a T. M. Long instrument. Oxygen permeability measurements on a Mocon Oxatran 2/20 show a significant reduction compared to a clay-free control.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polymer-clay nanocomposite comprising:
   (i) a melt-processible matrix polymer,
   (ii) a layered clay material, and
   (iii) a matrix polymer-compatible oligomer or polymer having an onium functional group bonded thereto.

2. The nanocomposite of claim 1, wherein the melt-processible matrix polymer is a polyester, polyetherester, polyamide, polyesteramide, polyurethane, polyimide, polyetherimide, polyurea, polyamideimide, polyphenyleneoxide, phenoxy resin, epoxy resin, polyolefin, polyacrylate, polystyrene, polyethylene-co-vinyl alcohol; copolymer thereof; or a mixture thereof.

3. The nanocomposite of claim 1, wherein the melt-processible matrix polymer is a partially aromatic polyamide, aliphatic polyamide, wholly aromatic polyamide, or a mixture thereof.

4. The nanocomposite of claim 1, wherein the melt-processible matrix polymer is poly(m-xylylene adipamide), isophthalic acid-modified poly(m-xylylene adipamide), nylon-6, nylon-6,6;, EVOH; a copolymer thereof; or a mixture thereof.

5. The nanocomposite of claim 1, wherein the melt-processible matrix polymer is poly(ethylene terephthalate), a copolymer thereof, or a mixture thereof.

6. The nanocomposite of claim 1, comprising greater than zero to about 25 weight percent of the layered clay material.

7. The nanocomposite of claim 1, comprising from about 0.5 to about 15 weight percent of the layered clay material.

8. The nanocomposite of claim 1, wherein the layered clay material is montmorillonite, hectorite, mica, vermiculite, bentonite, nontronite, beidellite, volkonskoite, saponite, magadite, kenyaite, or a mixture thereof.

9. The nanocomposite of claim 1, wherein the layered clay material is Wyoming-type sodium montmorillonite or Wyoming-type sodium bentonite.

10. The nanocomposite of claim 1, wherein the layered clay material is a free flowing powder having a cation exchange capacity from about 0.9 to about 1.5 meq/g.

11. The nanocomposite of claim 1, wherein at least 50 percent of the layered clay material is dispersed in the form of individual platelet particles and tactoids in the matrix polymer and the individual platelet particles have a thickness of less than about 2 nm and a diameter of from about 10 to about 3000 nm.

12. The nanocomposite of claim 1, wherein the functionalized oligomer or polymer and the melt-processible matrix polymer have the same monomer unit.

13. The nanocomposite of claim 1, wherein the layered clay material is treated with an organic cation.

14. The nanocomposite of claim 13, wherein the organic cation is derived from onium salt compound.

15. The nanocomposite of claim 14, wherein the onium salt compound is an ammonium or phosphonium salt compound.

16. The nanocomposite of claim 14, wherein the organic cation is an alkyl ammonium ion, alkyl phosphonium ion, polyalkoxylated ammonium ion, or a mixture thereof.

17. The nanocomposite of claim 1, wherein the melt-processible matrix polymer comprises poly(ethylene terephthalate) or a copolymer thereof, and the layered clay material is Wyoming-type sodium montmorillonite or Wyoming-type sodium bentonite.

18. An article prepared from the nanocomposite of claim 1.

19. The article of claim 18 in the form of film, sheet, pipe, an extruded article, a molded article or a molded container.

20. The article of claim 18 in the form of a bottle.

21. The article of claim 18, having a gas permeability which is at least 10 percent lower than that of an article formed from a clay-free polymer.

22. An article having a plurality of layers wherein at least one layer is formed from the nanocomposite of claim 1.

23. The article of claim 22, wherein the nanocomposite is disposed intermediate to two other layers.

24. The article of claim 22, having one or more layers of a structural polymer.

25. A polymer-clay nanocomposite comprising:
  (i) a melt-processible matrix polymer, and incorporated therein
  (ii) a concentrate comprising a layered clay material and a matrix polymer-compatible oligomer or polymer having an onium functional group bonded thereto.

26. The nanocomposite of claim 25, wherein the melt-processible matrix polymer is a polyester, polyetherester, polyamide, polyesteramide, polyurethane, polyimide, polyetherimide, polyurea, polyamideimide, polyphenyleneoxide, phenoxy resin, epoxy resin, polyolefin, polyacrylate, polystyrene, polyethylene-co-vinyl alcohol, a copolymer thereof, or a mixture thereof.

27. The nanocomposite of claim 25, wherein the melt-processible matrix polymer is a partially aromatic polyamide, aliphatic polyamide, wholly aromatic polyamide, or a mixture thereof.

28. The nanocomposite of claim 25, wherein the melt-processible matrix polymer is poly(m-xylylene adipamide) or a copolymer thereof, isophthalic acid-modified poly(m-xylylene adipamide), nylon-6, nylon-6,6; EVOH; a copolymer thereof; or a mixture thereof.

29. The nanocomposite of claim 25, wherein the melt-processible matrix polymer is poly(ethylene terephthalate), a copolymer thereof, or a mixture thereof.

30. The nanocomposite of claim 25, comprising greater than zero to about 25 weight percent of the layered clay material.

31. The nanocomposite of claim 25, wherein the layered clay material is montmorillonite, hectorite, mica, vermiculite, bentonite, nontronite, beidellite, volkonskoite, saponite, magadite, kenyaite, or a mixture thereof.

32. The nanocomposite of claim 25, wherein the layered clay material is Wyoming-type sodium montmorillonite or Wyoming-type sodium bentonite.

33. The nanocomposite of claim 25, wherein the layered clay material is a free flowing powder having a cation exchange capacity from about 0.9 to about 1.5 meq/g.

34. The nanocomposite of claim 25, wherein at least 50 percent of the layered clay material is dispersed in the form of individual platelet particles and tactoids in the matrix polymer and the individual platelet particles have a thickness of less than about 2 nm and a diameter of from about 10 to about 3000 nm.

35. The nanocomposite of claim 25, wherein the functionalized oligomer or polymer and the melt-processible matrix polymer have the same monomer unit.

36. The nanocomposite of claim 25, wherein the layered clay material is treated with an organic cation.

37. A process for preparing polymer-clay nanocomposite comprising the steps of:
  (i) forming a concentrate comprising a layered clay material and an oligomer or polymer having an onium functional group bonded thereto, and
  (ii) melt mixing the concentrate with a melt-processible matrix polymer to form a polymer-clay nanocomposite.

38. The process of claim 37, wherein steps (i) and (ii) are conducted by a batch mixing or a melt compounding extrusion process.

39. The process of claim 37, wherein the concentrate is prepared in water or a mixture of water and one or more water-miscible organic solvents is alcohols, ethers, acids, or nitriles.

40. The process of claim 39, wherein the water-miscible organic solvents is dioxane, tetrahydrofuran, methanol, ethanol, isopropanol, acetic acid, acetonitrile, or a mixture thereof.

41. The process of claim 37, wherein the functionalized oligomer or polymer and the melt-processible matrix polymer have the same monomer unit.

42. The process of claim 37, wherein the concentrate of step (i) comprises from about 20 to about 99.5 weight percent of the functionalized polymer or oligomer and from about 0.5 to about 80 weight percent of the layered clay material.

43. A nanocomposite material produced by the process of claim 37.

44. An article prepared from the nanocomposite material of claim 43.

45. The article of claim 44 in the form of film, sheet, fiber, an extruded article, a molded article, or a molded container.

46. The article of claim 44 in the form of a bottle.

47. The article of claim 44 having a gas permeability that is at least 10 percent lower than that of unmodified polymer.

48. A process for preparing a polymer-clay nanocomposite comprising:
  melt mixing a layered clay material, an oligomer or polymer having an onium functional group bonded thereto, and a melt-processible matrix polymer to form a polymer-clay nanocomposite material.

49. The process of claim 48, wherein the nanocomposite material comprises from about 0.5 to about 25 weight percent of the functionalized polymer or oligomer, from about 50 to about 99 weight percent of the matrix polymer, and from about 0.5 to about 25 weight percent of the layered clay material.

50. A nanocomposite material produced by the process of claim 48.

51. An article prepared from the nanocomposite material of claim 50.

52. The nanocomposite of claim 1, wherein the onium functional group is an ammonium group.

53. The nanocomposite of claim 25, wherein the onium functional group is an ammonium group.

54. The nanocomposite of claim 37, wherein the onium functional group is an ammonium group.

55. The nanocomposite of claim 49, wherein the onium functional group is an ammonium group.

* * * * *

UNITED STATES PATENT AND TRADEMARK OFFICE
CERTIFICATE OF CORRECTION

PATENT NO. : 6,384,121 B1
DATED : May 7, 2002
INVENTOR(S) : Barbee et al.

It is certified that error appears in the above-identified patent and that said Letters Patent is hereby corrected as shown below:

Title page,
Item [54], please correct the title to read:
-- POLYMER/CLAY NANOCOMPOSITE COMPRISING A FUNCTIONALIZED POLYMER OR OLIGOMER AND A PROCESS FOR PREPARING SAME --

Item [60], Related U.S. Application Data, please correct the provisional application no, to read: -- 60/111,323 --

Column 1,
Line 9, please correct the provisional application no. to read: -- 60/111,323 --

Signed and Sealed this

Twenty-ninth Day of October, 2002

Attest:

Attesting Officer

JAMES E. ROGAN
Director of the United States Patent and Trademark Office